United States Patent
Oota (10) Patent No.: US 6,714,792 B2
(45) Date of Patent: *Mar. 30, 2004

(54) SELECTIVE RADIO PAGING RECEIVER WITH DISPLAY FUNCTION

(75) Inventor: Makoto Oota, Shizuoka (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,003

(22) Filed: Mar. 16, 1999

(65) Prior Publication Data

US 2002/0080009 A1 Jun. 27, 2002

(30) Foreign Application Priority Data

Mar. 18, 1998 (JP) .......................................... 10-068573

(51) Int. Cl.⁷ ................................................. H04Q 7/20
(52) U.S. Cl. ................... 455/458; 455/426; 340/825.44
(58) Field of Search ............................... 455/31.3, 458, 455/3.05, 412, 414, 417, 426; 340/825.44, 825.47

(56) References Cited

U.S. PATENT DOCUMENTS

| | | | | |
|---|---|---|---|---|
| 4,766,434 A | * | 8/1988 | Matai et al. ............ | 340/825.44 |
| 4,818,987 A | * | 4/1989 | Ide et al. ................ | 340/825.47 |
| 4,845,491 A | * | 7/1989 | Fascenda et al. ....... | 340/825.44 |
| 5,043,718 A | * | 8/1991 | Shimura ................. | 340/825.44 |
| 5,049,874 A | * | 9/1991 | Ishida et al. ........... | 340/825.44 |
| 5,374,925 A | * | 12/1994 | Ohkuma ................. | 340/825.44 |
| 5,430,440 A | * | 7/1995 | Shim ...................... | 340/825.44 |
| 5,805,707 A | * | 9/1998 | Nakano .................. | 380/49 |
| 6,087,956 A | * | 7/2000 | Helferich ............... | 455/31.3 |
| 6,167,234 A | * | 12/2000 | McKibben et al. ..... | 455/31.1 |
| 6,173,165 B1 | * | 1/2001 | Ruhl et al. ............. | 455/186.1 |

FOREIGN PATENT DOCUMENTS

| | | |
|---|---|---|
| CN | 1234698 A | 11/1999 |
| JP | 2-146828 | 6/1990 |
| JP | 2-188035 | 7/1990 |
| JP | 3-21124 | 1/1991 |
| JP | 8-79815 | 3/1996 |
| JP | 8-307919 | 11/1996 |
| JP | 9-65396 | 3/1997 |
| JP | 9-233513 | 9/1997 |
| JP | 9-252479 | 9/1997 |

* cited by examiner

Primary Examiner—Edward F. Urban
Assistant Examiner—Thuan T. Nguyen
(74) Attorney, Agent, or Firm—Sughrue Mion, PLLC

(57) ABSTRACT

To provide a selective radio paging receiver which can receive timely and efficiently even under heavy traffic the service information which can include a vast amount of data. The selective radio paging receiver of the present invention comprises a receiving unit for receiving a selective radio paging signal, a user operation unit for accepting operations by a user, an analyzing unit for analyzing the received signal, a memory for storing temporarily the information which was divided at the time of transmission, an assembling unit for assembling the divided information, a man-machine interface for analyzing the operation information, and a display unit for displaying the output of the man-machine interface.

6 Claims, 7 Drawing Sheets

FIG.3A

| EXAMPLE GAME TABLE | | | WINNING TRICK |
|---|---|---|---|
| ○△YAMA | @01 — | @02 □▽KAWA | @03 |
| ×□UMI | @04 — | @05 △▲ | @06 |
| ○○YAMA | @07 — | @08 △□UMI | @09 |

FIG.3B

| FIRST TRANSMISSION | ¥01○¥02×¥03  SQUEEZING OUT |
|---|---|
| SECOND TRANSMISSION | ¥04×¥05○¥06 THROWING OVER |

FIG.3C

| MATCH TABLE | | | WINNING TRICK |
|---|---|---|---|
| ○△YAMA | ○—× | □▽KAWA | — SQUEEZING OUT |
| ×□UMI | ×—○ | △▲ | — THROWING OVER |
| ○○YAMA | | △□UMI | |

FIG.5A

[ [ 01     ] ] 10     ] ] 15
STEREO-TYPED SENTENCE 01    DATA 1    DATA 2

FIG.5B

10   :   15     MEETING START

DATA 1    DATA2

STEREO-TYPED SENTENCE 01

01  ○△YAMA  □▽KAWA
02  ×□UMI  △▲
03  ○○YAMA  △□UMI

FIG.7B

| [[ 02 | ]] 01 | ]] 03 | ]] 06 |
|---|---|---|---|
| SENTENCE 02 | GAME NUMBER | OUTCOME | WINNING TRICK |

FIG.7C

| OUTCOME: | ○△YAMA | DEFEATS | □▽KAWA | BY SQUEEZING OUT |
|---|---|---|---|---|
| | DATABASE | OUTCOME 03 | DATABASE | WINNING TRICK 06 |
| | STEREO-TYPED SENTENCE 02 | | | | ns # SELECTIVE RADIO PAGING RECEIVER WITH DISPLAY FUNCTION

BACKGROUND OF THE INVENTION

1. Technical Field of the Invention

The present invention relates to a selective radio paging receiver with display function.

2. Description of the Prior Art

Conventional selective radio paging receiver often receives information services at the time when the communication traffic is heavy.

Further, information services which include a vast amount of messages make the traffic heavier.

Accordingly, the long messages to be received are divided, for example, into two parts, assembled and the assembled messages are displayed by the receivers, in order to reduce the traffic. However, the reduction of traffic is not yet sufficient, because the messages are divided merely into a limited number of message parts.

The traffic is concentrated any way at a certain time of a day, because the information services are required to transmit various information timely to the users of the selective radio paging receiver.

SUMMARY OF THE INVENTION

Therefore, an object of the present invention is to provide a selective radio paging receiver which can receive timely and efficiently even under heavy traffic the service information which can include a vast amount of data.

The selective radio paging receiver of the present invention comprises a receiving unit for receiving a selective radio paging signal which is either an information message which includes data, or a private message which does not includes data; a user operation unit for accepting operations by a user; an analyzing unit for analyzing the received signal; a memory for storing temporarily the information message which has been divided at the time of transmission; an assembling unit for assembling the divided information; a man-machine interface for analyzing the operation information and the output from the assembling unit; and a display unit for displaying the output from the man-machine interface. The present invention is characterized firstly in that an information message is divided into a long base message and a short difference message and the base message and the difference message are assembled by the receiver. Here, the information message consists of two parts, namely, base message part and difference message part. Further, the present invention is characterized secondly in that the base message is transmitted beforehand during low traffic hours and the difference message is transmitted timely afterward during heavy traffic hours. Thus, the congestion of traffic can be avoided.

According to the present invention, the traffic can be reduced even when a large amount of data are transmitted, because an information is divided into a plurality of parts, and transmission timings are chosen depending upon the amount of information of the divided parts. Concretely, large data such as database are transmitted during low traffic hours, and small data are transmitted during heavy traffic hours.

Further, according to the present invention, the users of the selective radio paging receiver of the present invention can receive information service timely and efficiently even during heavy traffic hours such as the afternoon, because information is divided and delivered to the users.

PREFERRED EMBODIMENT OF THE INVENTION

Figure 1:
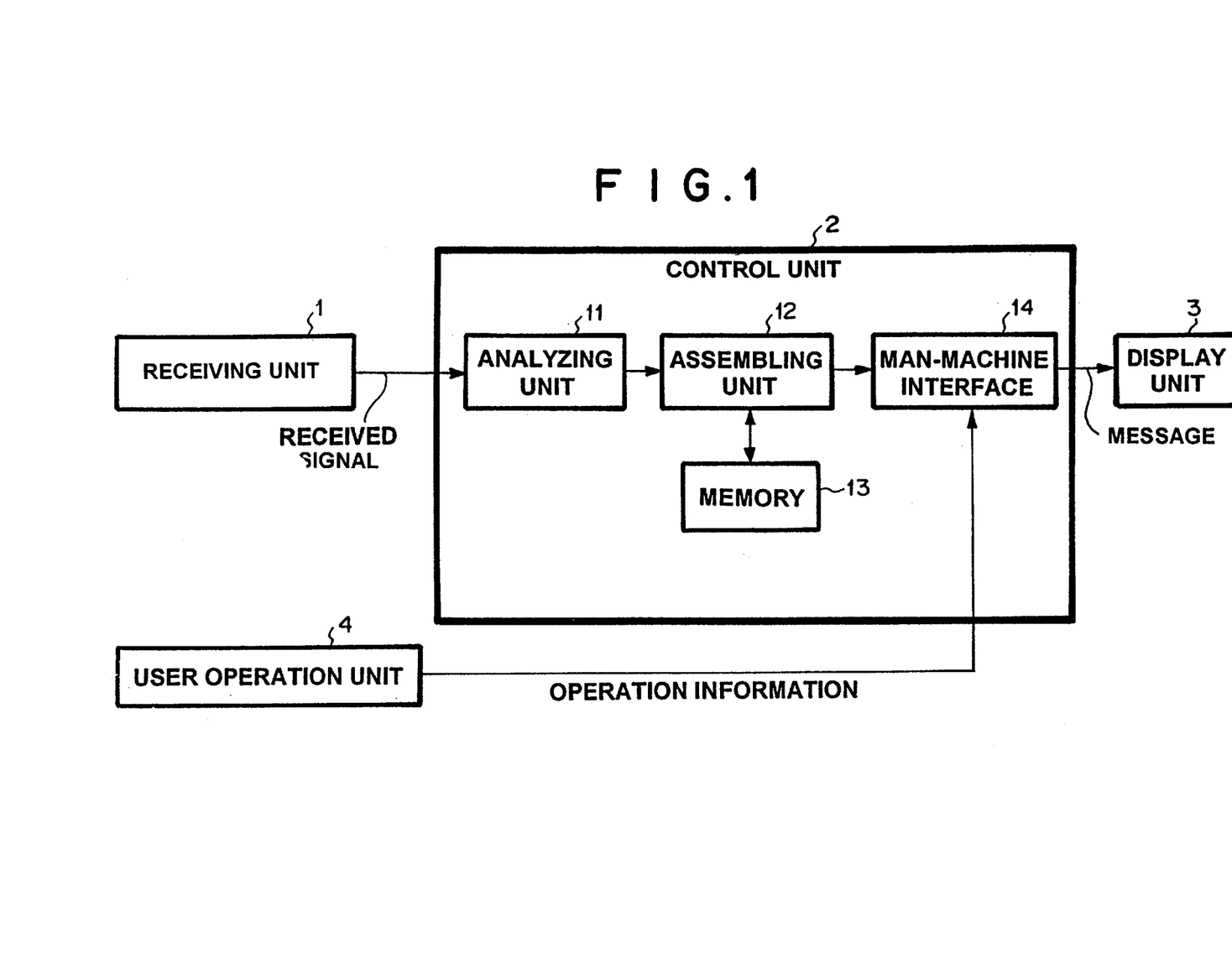
FIG. 1 is a block diagram of a first mode of embodiment of the present invention of a selective radio paging receiver with display function.

As shown in FIG. 1, the selective radio paging receiver of the present invention comprises receiving unit 1 for receiving selective radio paging signal which is either an information message which includes data, or a private message which does not includes data; user operation unit 4 for accepting operations by a user; analyzing unit 11 for analyzing the received signal; memory 13 for storing temporarily the information message which has been divided at the time of transmission; assembling unit 12 for assembling the divided information message; man-machine interface 14 for analyzing the operation information from user operation unit 4 and the output from assembling unit 12; and display unit 3 for displaying the output of man-machine interface 14.

The action of the selective radio paging receiver of the present invention is explained below.

Figure 2:
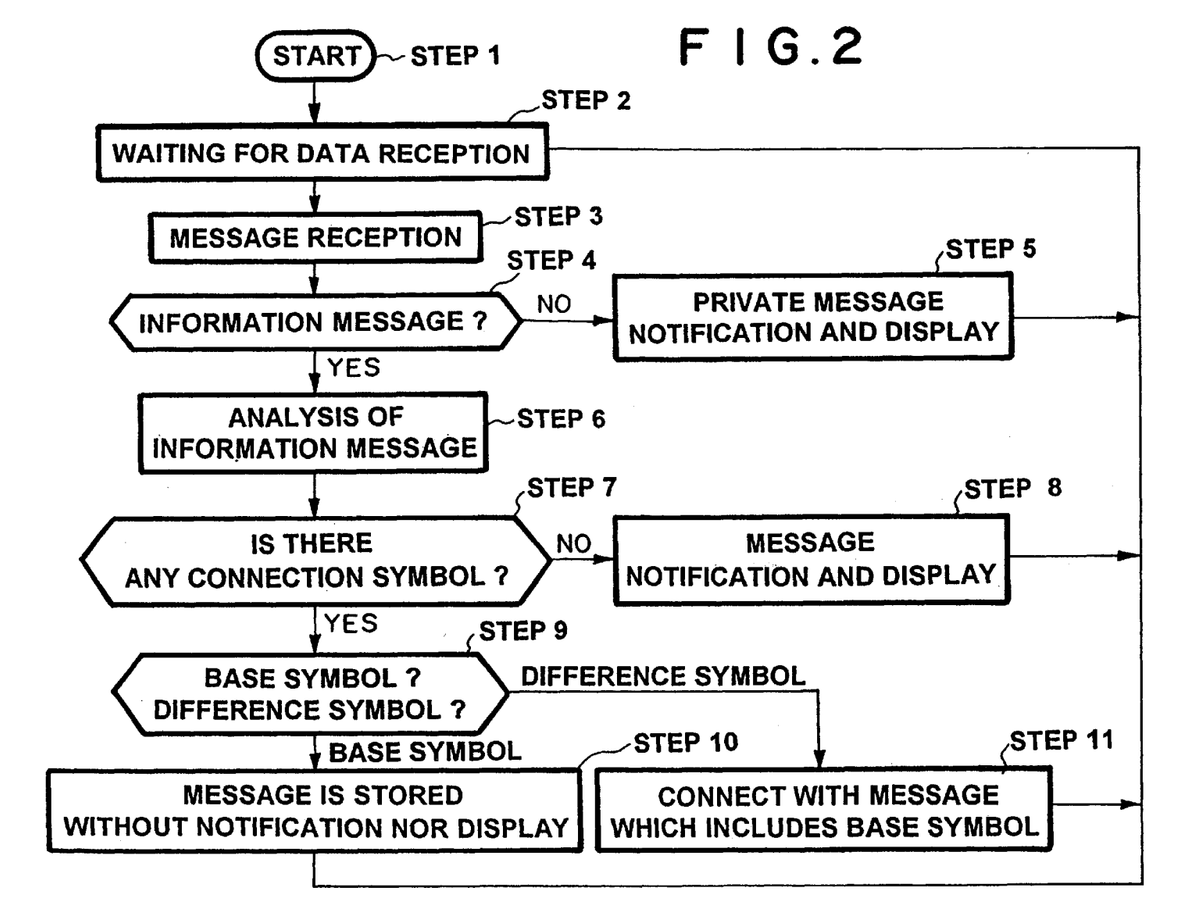
FIG. 2 is a flow chart for explaining an operation of the first mode of embodiment of the present invention of a selective radio paging receiver with display function.

As shown in FIG. 2, a message is received in step 3. Step 4 is a discriminant step to classify the received message into an information message or into a private message. The private message is notified and displayed on the receiver in step 5, while a prescribed symbol for message connection is searched in steps 6 and 7 in case of information message. If there is no connection symbol, the information message is notified and displayed on the user receiver in step 8. On the contrary, if there is a connection symbol, then the content of the symbol is analyzed in step 9. If the connection symbol is a base symbol which indicates that the received message is a main part, namely, a base part of the original message, the base message is stored in memory 13 in step 10 without any notification nor display. If the connection symbol is a difference symbol which indicates that the received message is a remainder part of the information message subtracted by the base message, then the difference message is connected with the base message which is stored in memory 13, and is notified and displayed in step 11. All the displays mentioned-above are executed by display unit 3.

Further, the action of the receiver of the present invention is explained concretely from the point of view of transmission of message.

Figure 3A:
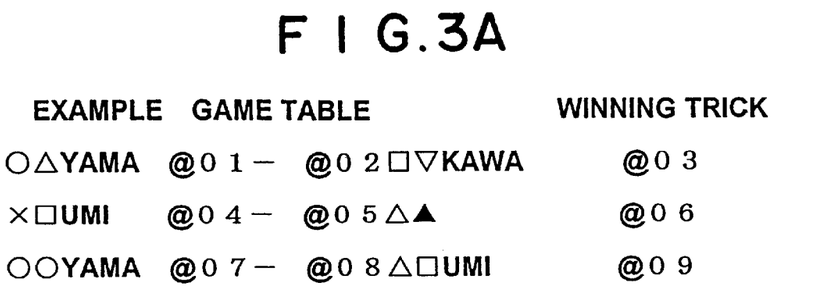
FIG. 3A is an exemplary database to be transmitted.
Figure 3B:
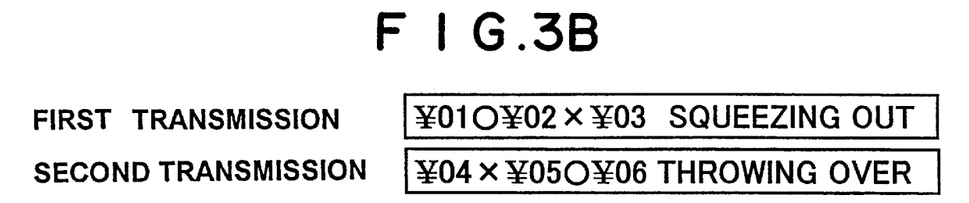
FIG. 3B is an exemplary data to be added to the transmitted data.
Figure 3C:
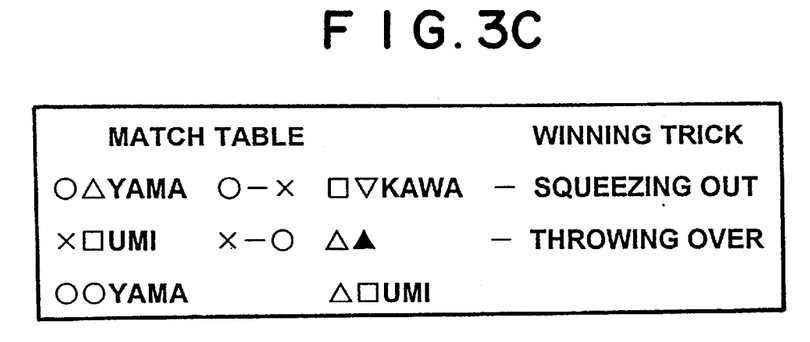
FIG. 3C is an exemplary display of the whole transmitted data.

FIG. 3A is an exemplary database of an outcome of Japanese traditional Sumoh wrestling. FIG. 3B is an exemplary transmission data of the above-mentioned database. FIG. 3C is an exemplary display of messages which are assembled by the receiver of the present invention.

The database as shown in FIG. 3A is transmitted during the time of low traffic such as early morning or midnight. Here, the base symbol @0X is added at the points where additional information is inserted afterward. The transmitted data is stored in memory 13 without notification nor display of the received data.

The difference message such as victory or defeat, or wining trick are transmitted together with the difference symbol ¥0X even during heavy traffic. The difference symbol ¥0X forms a counterpart of the base symbol @0X.

The receiver assembles the message with the difference symbol and the message with the base symbol and then displays the whole message which includes the names of wrestlers, lose or win, and winning trick. The receiver may also drive a speaker to inform the whole message.

In the first mode of the invention mentioned-above, the base message and the difference message are assembled and displayed by the receiver.

Figure 4:
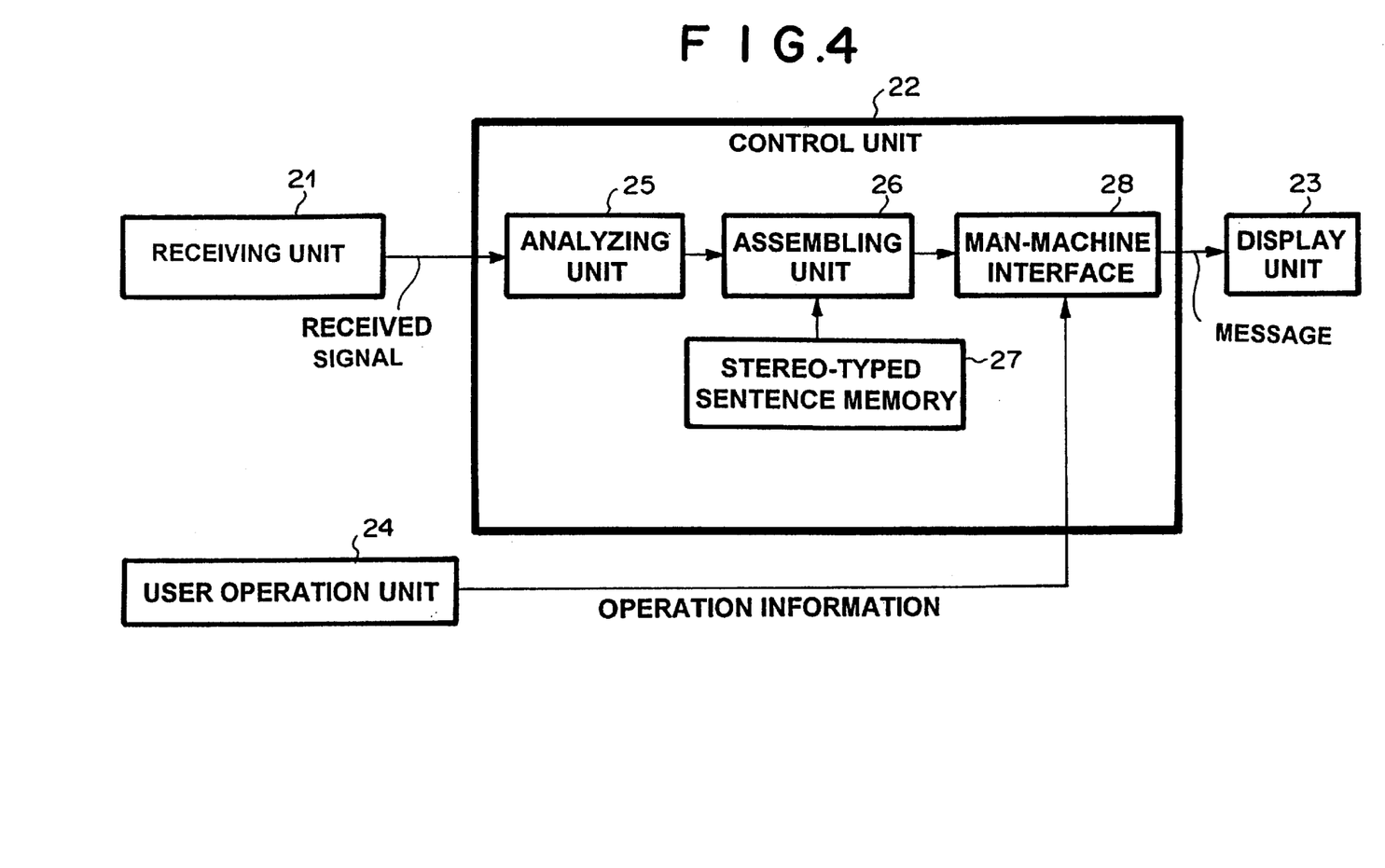
FIG. 4 is a block diagram of a second mode of embodiment of the present invention of a selective radio paging receiver with display function.

In the second mode of the invention as shown in FIG. 4, contents of stereo-typed sentences are expanded. An exemplary stereo-typed sentence is shown in FIG. 5A, while an exemplary display of the received stereo-typed sentence is shown in FIG. 5B.

The object of the second mode of the invention is to extend the contents of stereo-typed sentences by introducing expansion order and additional information (data 1 and data 2) into the message including the stereo-typed sentence.

As shown in FIG. 4, control unit 22 comprises analyzing unit 25 for analyzing received information, assembling unit 26 for assembling the received stereo-typed sentence and the additional information, stereo-typed sentence memory 27 for storing the contents of prescribed stereo-typed sentences, man-machine interface 28 for analyzing the operation information from user operation unit 24 and the output from assembling unit 26 to control the display of the received information.

Figure 5A:
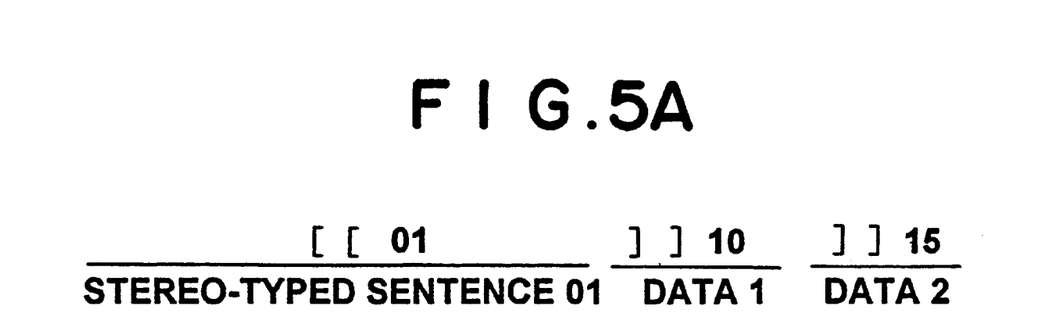
FIG. 5A is an exemplary data for a stereo-typed sentence to be transmitted.
Figure 5B:
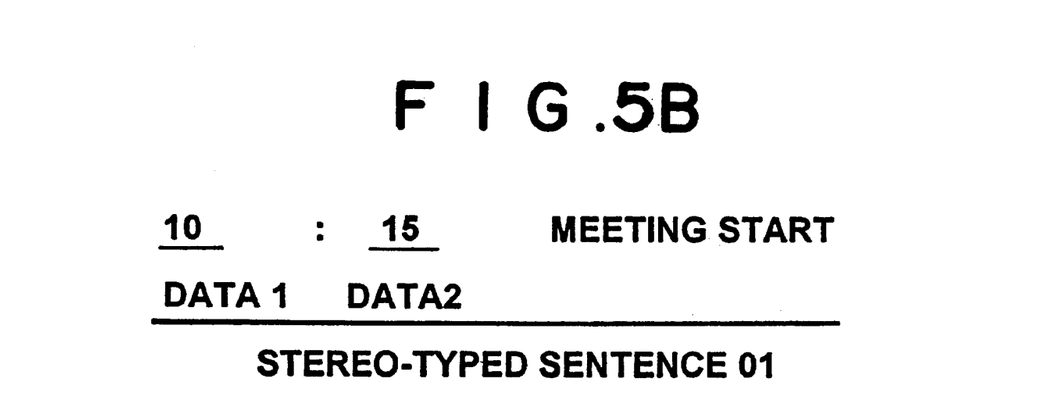
FIG. 5B is an exemplary display of the stereo-typed sentence.

As shown in FIG. 5A, when analyzing unit 25 detects a stereo-typed sentence 01, assembling unit 26 reads out the contents corresponding to the stereo-typed sentence 01 in stereo-typed sentence memory 27 and adds data 1 and data 2 following [[01. The command to expand the stereo-typed sentence (01) and the word sequence (10,15) which is the additional information are transmitted at a time.

As shown in FIG. 5B, the word sequence (10,15) is integrated into the stereo-typed sentence to display the complete information message on display unit 23.

Figure 6:
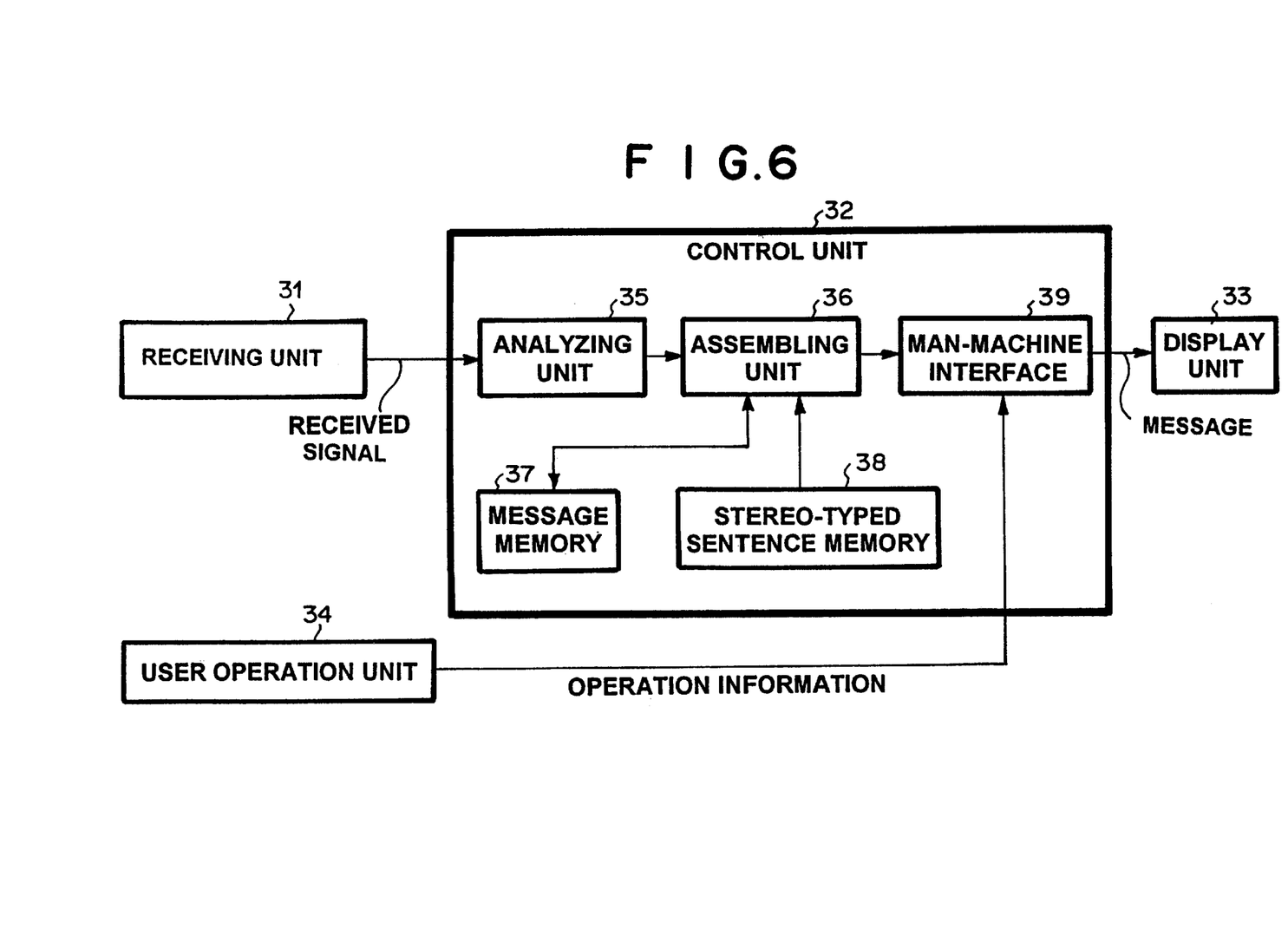
FIG. 6 is a block diagram of a third mode of embodiment of the present invention of a selective radio paging receiver with display function.
Figure 7A:
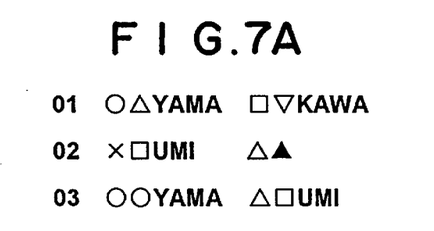
FIG. 7A is an exemplary database to be transmitted in the third mode of embodiment of the present invention.
Figure 7B:
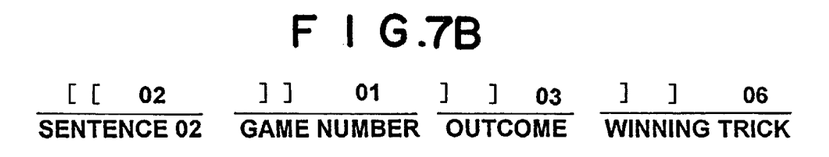
FIG. 7B is an exemplary data for a stereo-typed sentence in the third mode of embodiment of the present invention.
Figure 7C:
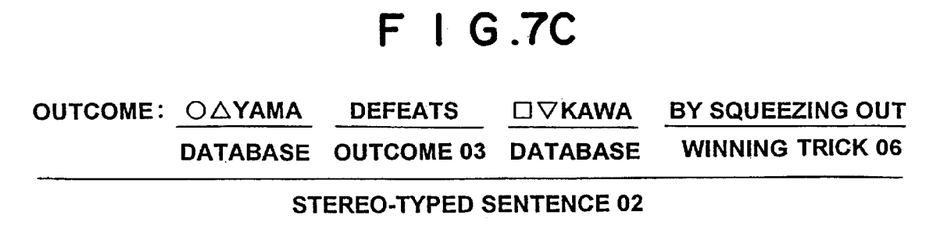
FIG. 7C is an exemplary display of the whole transmitted data. sentence in the third mode of embodiment of the present invention.

Further, in the third mode of the present invention as shown in FIG. 6, the database as explained in the first mode of the invention and the stereo-typed sentences as explained in the second mode of the invention are combined. An exemplary database to be transmitted is shown in FIG. 7A, while an exemplary stereo-typed sentence to be transmitted is shown in FIG. 7B. Further, an exemplary display using the received data base and stereo-typed sentence is shown in FIG. 7C.

As shown in FIG. 6, control unit 32 comprises analyzing unit 35 for analyzing the received signal, message memory 37 for storing temporarily the received database, assembling unit 36 for assembling the stereo-typed sentence and the database, stereo-typed sentence memory 38 for storing the contents of prescribed stereo-typed sentences, and man-machine interface 39 for analyzing the operation information from user operation unit 34 and the output from assembling unit 36 to control the display of the whole content of the received information.

As shown in FIG. 7A, when analyzing unit 35 recognizes a reception of a database message by detecting a prescribed index, message memory 37 stores temporarily the database message. The database message itself is not displayed alone.

As shown in FIG. 7B, when the received information is found to be a stereo-typed sentence in analyzing unit 35, the corresponding content of the sentence is expanded from stereo-typed sentence memory 38. Here, in the example as shown in FIG. 7B, sentence 02, the word "outcome", and the word "winning trick" are assumed to be stored in stereo-typed sentence memory 38. Assembling unit 36 combines the expanded content of the sentence 02, a received result for the "outcome", a received data of "winning trick", a game number 01 which is stored in message memory 37.

A game table with game number as shown in FIG. 7A is transmitted during low traffic hours. The selective radio paging receiver receives the transmitted table and stores it in message memory 37 without any notification nor display of the reception of the transmitted table. Then, afterward, sentence 02 and additional data such as game number, outcome of game, and codes of winning tricks as shown in FIG. 7B are transmitted at a time when needed even during heavy traffic.

The receiver of the present invention extracts data necessary for display from the message including the stereo-typed sentence and integrates the data into the stereo-typed sentence and display the complete message on display unit 33.

Thus, time dependent information such as game result of Sumoh wrestling, baseball, or soccer can be received timely without any influence of traffic condition.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A selective radio paging receiver with display function, comprising:

first receiving means for receiving non-urgent information at earlier time;

storing means for storing said non-urgent information;

second receiving means for receiving urgent information at later time;

completing means for combining said non-urgent information and said urgent information in order to complete information; and displaying means for displaying the completed information on a display, wherein said non-urgent information includes one or more spaces into which one or more words are to be inserted;

wherein said urgent information includes one or more words to be inserted to said one or more spaces; and wherein said completing means inserts said one or more words to said one or more spaces when combining said non-urgent information and said urgent information.

2. A selective radio paging receiver with display function, comprising:

storing means for storing stereo-type sentences;

receiving means for receiving information including an identifier of one of said stereo-type sentences and one or more words to be inserted into the identified stereo-type sentence;

inserting means for inserting said one or more words to the identified stereo-type sentence; and displaying means for displaying the identified stereo-type sentence with said one or more words.

3. A selective radio paging receiver with display function which comprises:

a receiving unit for receiving a radio paging signal which is either an information message or a private message;

an analyzing unit for analyzing whether or not said radio paging signal is said information message, and for further analyzing whether said information message is a base message, or a difference message which is a remainder part of said information message subtracted from said base message wherein said difference message is made shorter than said base message;

first storage means for storing stereo-type sentences including one or more spaces into which one or more words are inserted;

first receiving means for receiving non-urgent information at earlier time;

second storing means for storing said non-urgent information, second receiving means for receiving urgent information at later time, said urgent information including an identifier of one of said stereo-type sentences, one or more words to be inserted to the identified stereo-type sentences and an identifier of a part of said non-urgent information; and completing means for inserting said one or more words into said one or more spaces of the identified stereo-type sentence and inserting the identified part of said non-urgent information into the identified stereo-type sentence in order to complete information; and displaying means for displaying the completed information on a display.

4. A method for receiving and displaying information, comprising the steps of:

receiving non-urgent information at earlier time;

storing said non-urgent information;

receiving urgent information at later time;

combining said non-urgent information and said urgent information in order to complete information; and displaying the completed information on a display, wherein said non-urgent information includes one or more spaces into which one or more words are to be inserted;

wherein said urgent information includes one or more words to be inserted to said one or more spaces; and further comprising:

a step of inserting said one or more words to said one or more spaces when combining said non-urgent information and said urgent information.

5. A method for receiving and displaying information comprising the steps of:

storing stereo-type sentences, receiving information including an identifier of one of said stereo-type sentences and one or more words to be inserted into the identified stereo-type sentence;

inserting said one or more words to the identified stereo-type sentence; and displaying the identified stereo-type sentence with said one or more words.

6. A method for receiving and displaying information comprising the steps of:

storing stereo-type sentences including one or more spaces into which one or more words are to be inserted;

receiving non-urgent information at earlier time;

storing said non-urgent information, receiving urgent information at later time, said urgent information including an identified of one of said stereo-type sentences, one or more words to be inserted to the identified stereo-type sentence and an identifier of a part of said non-urgent information; and inserting said one or more words into said one or more spaces of the identified stereo-type sentence and inserting the identified part of non-urgent information into the identified stereo-type sentence in order to complete information; and displaying the completed information on a display.

* * * * *